(12) United States Patent
Watou et al.

(10) Patent No.: US 8,444,204 B2
(45) Date of Patent: May 21, 2013

(54) VEHICLE WINDOW MOLDING AND METHOD FOR MOLDING THE SAME

(75) Inventors: Yasuhiro Watou, Aichi (JP); Asao Koide, Aichi (JP)

(73) Assignee: Tokai Kogyo Co., Ltd., Obu (JP)

( * ) Notice: Subject to any disclaimer, the term of this patent is extended or adjusted under 35 U.S.C. 154(b) by 127 days.

(21) Appl. No.: 13/070,909

(22) Filed: Mar. 24, 2011

(65) Prior Publication Data
US 2011/0291437 A1 Dec. 1, 2011

(30) Foreign Application Priority Data
May 31, 2010 (JP) ................................ P2010-124846

(51) Int. Cl.
*B60J 10/02* (2006.01)
(52) U.S. Cl.
USPC ...................... 296/93; 156/244.18; 296/190.1
(58) Field of Classification Search
USPC 296/93, 96.21, 146.15, 201, 84.1; 52/204.59, 52/208; 49/475.1, 496.1; 156/244.18
IPC ........................................................ B60J 10/02
See application file for complete search history.

(56) References Cited

U.S. PATENT DOCUMENTS

| | | | | |
|---|---|---|---|---|
| 6,179,940 | B1 * | 1/2001 | Escobar-Y-Gamboa et al. | 156/108 |
| 6,810,635 | B2 * | 11/2004 | Meizlish | 52/716.5 |
| 6,862,851 | B2 * | 3/2005 | Burnside et al. | 52/204.66 |
| 2009/0212588 | A1 * | 8/2009 | Schlater et al. | 296/93 |

FOREIGN PATENT DOCUMENTS

JP A-2007-290525 11/2007

* cited by examiner

*Primary Examiner* — Glenn Dayoan
*Assistant Examiner* — Pinel Romain
(74) *Attorney, Agent, or Firm* — Oliff & Berridge, PLC

(57) ABSTRACT

A long vehicle window molding which is disposed along a windowpane attached to a window frame of a car body and is fixed to the window pane by a double-sided tape, the vehicle window molding comprising: a window molding main body; a lip portion that protrudes from an end portion of the window molding main body toward a circumference wall portion of the window frame; and the double-sided tape, wherein the double-sided tape is attached to a tape attaching surface of the window molding main body, and wherein a position of a side edge of the double-sided tape and a position of an edge of the tape attaching surface at an opposite side of the end portion of the window molding main body from which the lip portion protrudes coincide with each other along a longitudinal direction of the window molding main body.

12 Claims, 7 Drawing Sheets

A-A CROSS-SECTIONAL VIEW

A-A CROSS-SECTIONAL VIEW

RELATED-ART

VEHICLE WINDOW MOLDING AND METHOD FOR MOLDING THE SAME

CROSS-REFERENCE TO RELATED APPLICATIONS

This application claims priority from Japanese Patent Application No. 2010-124846 filed on May 31, 2010, the entire contents of which are incorporated herein by reference.

TECHNICAL FIELD

Aspects of the present invention relate to a long vehicle window molding which is disposed along an outer periphery edge of a rear surface of a windowpane attached to a window frame of a car body and is fixed to the rear surface of the windowpane by a double-sided tape, and a method for manufacturing the window molding.

BACKGROUND

For example, related-art describes bonding and fixing a windowpane (a window glass) or the like of an motor vehicle to a window frame by attaching a window molding along an outer periphery edge of a rear surface of a windowpane by a double-sided tape or the like, fitting the windowpane to the window frame provided with an adhesive, and hardening the adhesive between an inner periphery side of the window molding, the window frame, and the windowpane, thereby blocking the gap between the windowpane and the window frame.

In the related-art windowpane, at times, an opaque coloring layer (for example, a black ceramic or the like) is formed along an outer periphery edge of the rear surface of the windowpane so that the adhesive of the rear side of the windowpane, an interior material of the car body, or the like, can not be seen through from a front side of the windowpane.

Meanwhile, by reducing a width of the window molding, a cross-sectional area of the window molding is reduced accordingly, and the window molding can become lighter in weight. Further, by reducing the width of the window molding, it is possible to set the position of the edge of the window molding in the width direction thereof, at the time of attaching the window molding to the windowpane, at the outer periphery side of the windowpane accordingly. As a result, an adhesive provided in the inner periphery side of the window molding can be made closer to the outer periphery side of the windowpane, whereby it is possible to reduce the width of a bottom wall portion (a portion facing the rear surface of the windowpane) of the window frame to be bonded to the windowpane via the adhesive (that is, it is possible to make the inner periphery edge of the bottom wall portion of the window frame close to the outer periphery side). As a result, an interior material of the car body or the like situated near the inner periphery of the window frame can be made closer to the outer periphery side of the windowpane, whereby it is possible to make the opaque coloring layer for concealing the interior material or the like closer to the outer periphery side of the windowpane. As a result, the formation range of the opaque coloring layer blocking visibility via the windowpane can be narrowed (that is, the range of not forming the opaque coloring layer is extended), whereby a view of an outside of the vehicle, when viewed from an inside of the vehicle via the windowpane, can be expanded.

According to this configuration, by reducing the width of the window molding, the window molding can become lighter in weight and the view via the windowpane can be expanded. Thus, the width of the window molding is required to be reduced.

However, in the window molding fixed on the rear surface of the windowpane by a double-sided tape, since the double-sided tape needs to be attached on the attached surface of the window molding, which faces the rear surface of the windowpane, the width of the tape attaching surface of the window molding needs to be reduced in order to reduce the width of the window molding.

The width of the tape attaching surface of the window molding needs to be equal to or greater than the width of the double-sided tape, but it is difficult to set the width of the double-sided tape to be equal to or less than a certain width due to a restriction in the manufacturing of the double-sided tape. Further, when the double-sided tape is attached on the tape attaching surface of the window molding in the case of using a tape guide that guides the double-sided tape at a predetermined position of the tape attaching surface, since there is a need to attach the double-sided tape on the tape attaching surface of the window molding by, for example, leaving about 1 mm of the both ends of the tape attaching surface as a guide margin 21b (see FIG. 8), respectively, the width of the tape attaching surface becomes larger than the width of the double-sided tape by the guide margin of both ends (for example, about 2 mm).

In the window molding where the double-sided tape is attached on the tape attaching surface by leaving the guide margin of the double-sided tape, the width of the tape attaching surface is greater than the width of the double-sided tape by the guide margin of both ends, and it is difficult to reduce the width of the tape attaching surface and reduce the width of the window molding.

SUMMARY

Accordingly, an object of the invention makes it possible to reduce the width of the tape attaching surface of the window molding and reduce the width of the window molding, and satisfy the demand for light-weight window molding or the expansion in the view via the windowpane.

According to an aspect of the invention, there is provided a long vehicle window molding, which is disposed along an outer periphery edge of a rear surface of a windowpane attached to a window frame of a car body and is fixed to the rear surface of the windowpane by a double-sided tape, the vehicle window molding comprising: a window molding main body that is disposed along the outer periphery edge of the rear surface of the windowpane; a lip portion that protrudes from an end portion of the window molding main body toward a circumference wall portion of the window frame which faces an outer periphery end surface of the windowpane; and the double-sided tape, wherein the double-sided tape is attached to a tape attaching surface of the window molding main body, which faces the rear surface of the windowpane, and wherein a position of a side edge of the double-sided tape and a position of an edge of the tape attaching surface at an opposite side of the end portion of the window molding main body from which the lip portion protrudes coincide with each other along a longitudinal direction of the window molding main body.

According to another aspect of the invention, there is provided a method for manufacturing a long vehicle window molding which is disposed along an outer periphery edge of a rear surface of a windowpane attached to a window frame of a car body and is fixed to the rear surface of the windowpane by a double-sided tape, the vehicle window molding including, a window molding main body that is disposed along the outer periphery edge of the rear surface of the windowpane, a lip portion that protrudes from an end portion of the window molding main body toward a circumference wall portion of the window frame which faces an outer periphery end surface of the windowpane, and the double-sided tape, and a window molding intermediate body is used for forming the vehicle window molding, the window molding intermediate body including a pair of window molding main bodies and a pair of lip portions, and the window molding intermediate body being formed in a shape in which end portions of the window molding main bodies, which are opposite to the end portions from which the lip portions protrude, are joined together, such that at least the edges of the tape attaching surfaces which faces the rear surface of the windowpane are joined to each other at a joint portion, the method of manufacturing the vehicle window molding comprising: preparing the window molding intermediate body; attaching a piece of double-sided tape over the respective tape attaching surfaces of the window molding main bodies of the window molding intermediate body; and dividing the window molding intermediate body and the piece of double-sided tape along the joint portion of the window molding main bodies.

According to another aspect of the invention, there is provided a long vehicle window molding, which is disposed along an outer periphery edge of a rear surface of a windowpane attached to a window frame of a car body and is fixed to the rear surface of the windowpane by a double-sided tape, the vehicle window molding comprising: a window molding main body that is disposed along the outer periphery edge of the rear surface of the windowpane; a lip portion that protrudes from an end portion of the window molding main body toward a circumference wall portion of the window frame which faces an outer periphery end surface of the windowpane; and the double-sided tape, wherein the double-sided tape is attached to a tape attaching surface of the window molding main body, which faces the rear surface of the windowpane, and wherein in forming a side edge of the double-sided tape and an edge of the tape attaching surface that is at an opposite side of the end portion of the window molding main body from which the lip portion protrudes, a window molding intermediate body and a piece of double-sided tape for forming the vehicle window molding are cut at a position where the window molding intermediate body and the piece of double-sided tape overlap each other.

DETAILED DESCRIPTION

Hereinafter, an exemplary embodiment embodying a mode for carrying out the invention will be described.

Figure 1:
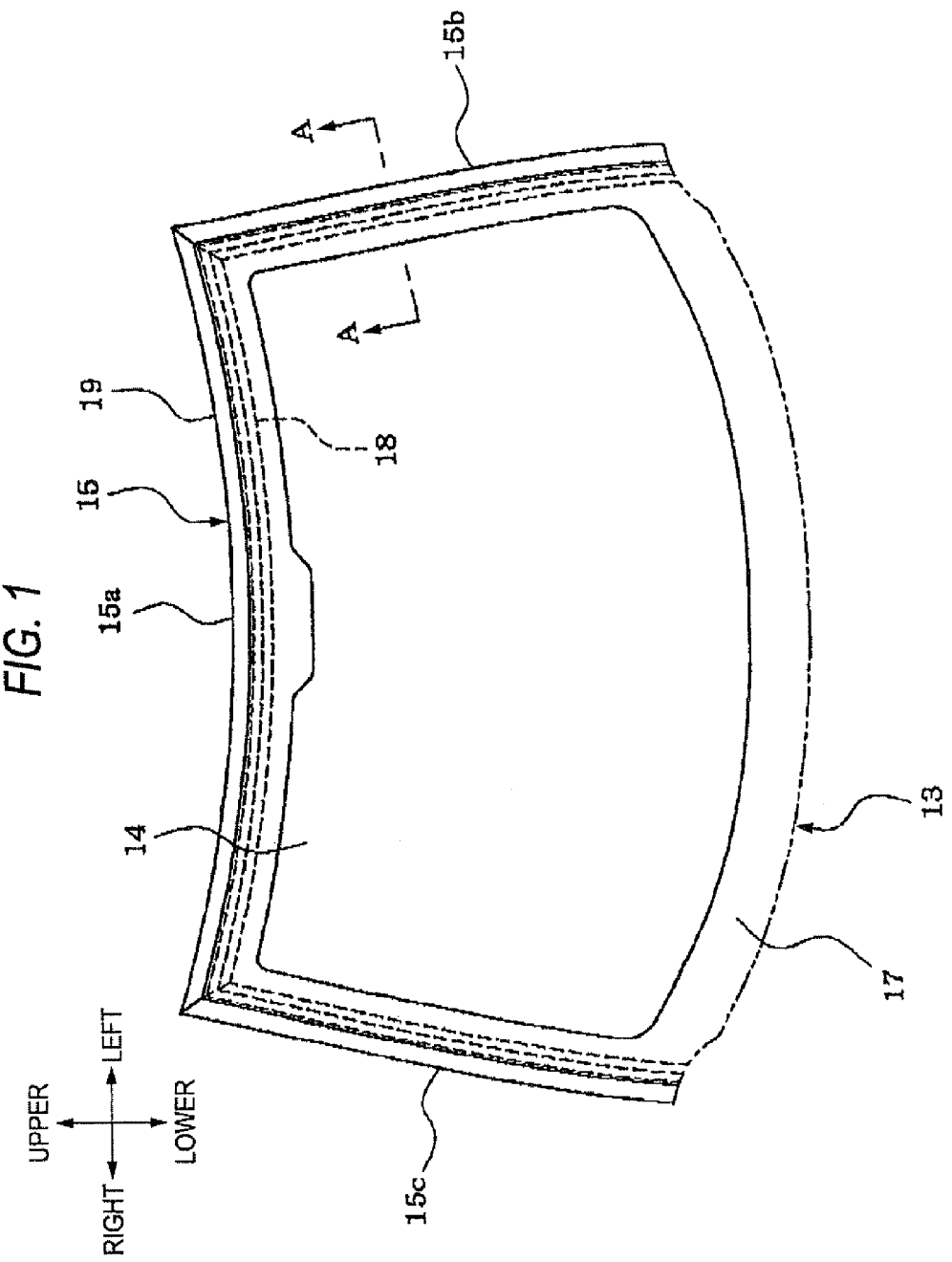
FIG. 1 is a front diagram of a window assembly in an exemplary embodiment of the invention.
Figure 2:
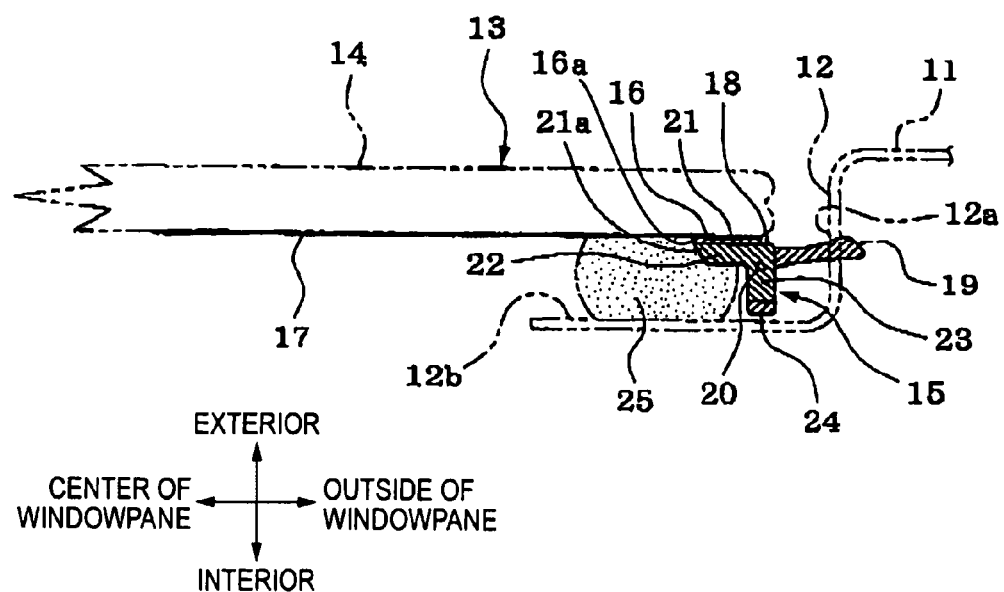
FIG. 2 is a cross-sectional diagram taken from the line A-A of FIG. 1.

As shown in FIGS. 1 and 2, a window assembly 13 is attached to a window frame 12 for a front window formed in a car body panel 11 (see FIG. 2) of a motor vehicle. The window assembly 13 includes a windowpane 14 (a window glass), and a long window molding 15 that is disposed along the outer periphery edge (an upper edge and both left and right side edges in the exemplary embodiment) of the rear surface of the windowpane 14, and the window molding 15 is fixed to the rear surface of the windowpane 14 by a double-sided tape 16 (also referred to as a double-sided adhesive tape or a double-sided attaching tape). In addition, the window molding 15 is configured by connecting a window molding 15b mounted along a left side edge of the windowpane 14 and a window molding 15c mounted along a right side edge of the windowpane 14 to both ends of a window molding 15a mounted along an upper edge of the windowpane 14. Moreover, on the rear surface of the windowpane 14, an opaque coloring layer 17 (for example, a black ceramic or the like) is formed along the outer periphery edge of the windowpane 14 at a predetermined width. Due to the opaque coloring layer 17, a (urethane) sealant 25, an interior material of the car body, or the like at the rear side of the outer periphery edge of the windowpane 14 is hidden when seen from the surface side of the windowpane 14.

As shown in FIG. 2, in the window molding 15, by the extrusion molding of an elastic polymer material such as a rubber or a thermoplastic synthetic resin (including a thermoplastic elastomer), a window molding main body 18 disposed along the outer periphery edge of the rear surface of the windowpane 14 is formed integrally with a lip portion 19 protruding from the window molding main body 18 toward a circumference wall portion 12a facing the outer periphery end surface of the windowpane 14 of the window frame 12, and in the inner portion of the window molding main body 18, a contraction preventing wire 20 is embedded.

Further, the double-sided tape 16 is attached to a tape attaching surface 21 which faces the rear surface of the windowpane 14 of the window molding main body 18, and a position of the side edge 16a of the double-sided tape 16 approximately coincides with a position of the edge 21a of an opposite side of the lip portion 19 of the tape attaching surface 21 along a longitudinal direction of the window molding main body 18 (that is, the double-sided tape 16 is attached up to the edge 21a of the opposite side of the lip portion 19 of the tape attaching surface 21).

In the window molding main body 18, a head portion 22 formed with the tape attaching surface 21, and a leg portion 23 protruding from the head portion 22 toward a bottom wall portion 12b facing the rear surface of the windowpane 14 of the window frame 12 are integrally provided.

The window molding main body 18 (the head portion 22 and the leg portion 23) are formed, for example, of a TPO (olefin-based thermoplastic elastomer), and the lip portion 19 is formed of a TPO softer than the TPO forming the window molding main body 18, so that the window molding main body 18 and the lip portion 19 have suitable elasticity, respectively. Further, in the front end portion of the leg portion 23, a soft portion 24 formed of a TPO softer than the TPO forming the window molding main body 18 may be provided.

The window molding main body 18 may be formed of vinyl chloride, and the lip portion 19 may be formed of a vinyl chloride-based elastomer softer than the window molding main body 18. Further, the window molding main body 18 and the lip portion 19 may be formed of an EPDM (ethylene propylene diene rubber) of the same hardness. In this manner, it is possible to make the window molding main body 18 and the lip portion 19 have suitable elasticity, respectively.

By attaching the double-sided tape 16 over the whole length of the window molding 15 (the window molding main body 18) along an outer periphery edge of the rear surface of the windowpane 14, there is provided a window assembly 13 to which the window molding 15 is bonded along the outer periphery edge of the rear surface of the windowpane 14. In the case of attaching the window assembly 13 to the window frame 12, firstly, a (urethane) sealant 25 (for sealing and bonding) of a paste form is discharged to the inner periphery side of the window molding 15 of the rear surface of the windowpane 14. Then, the window assembly 13 is bonded and fixed to the window frame 12 by fitting the window assembly 13 into the window frame 12 and hardening the (urethane) sealant 25.

Next, a device and a method for manufacturing the window molding 15 will be described using FIGS. 3 to 6.

Figure 3:
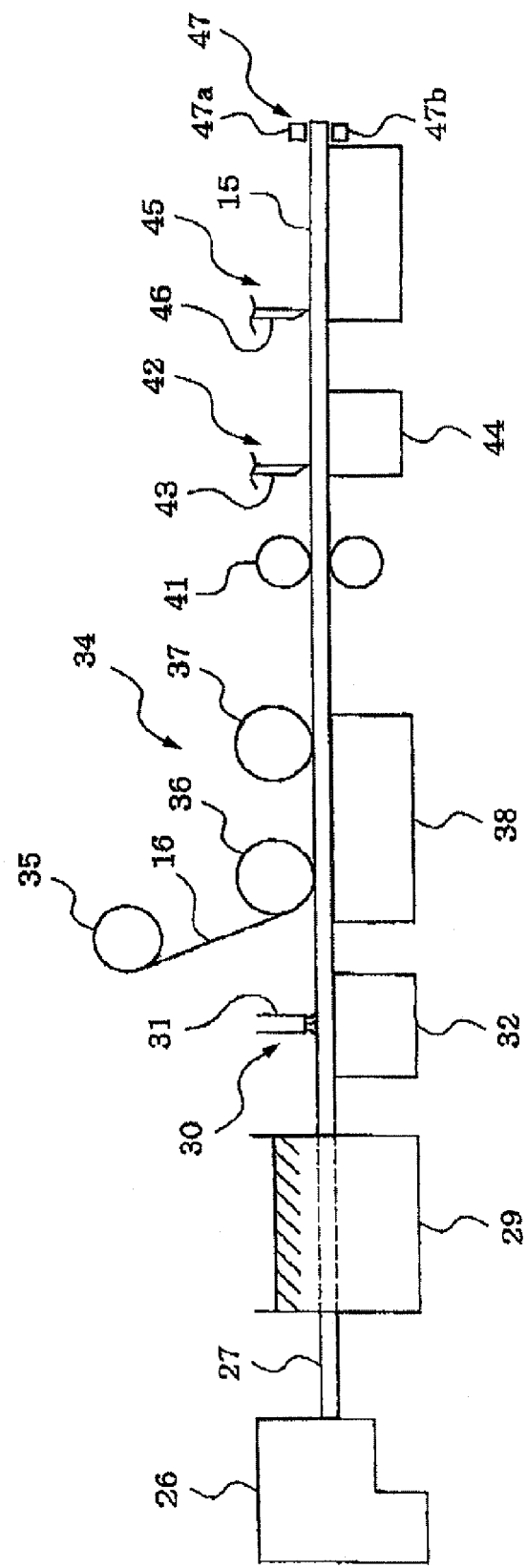
FIG. 3 is a schematic configuration diagram of a manufacturing device of a window molding.

As shown in FIG. 3, in the case of manufacturing the window molding 15, firstly, by an extrusion machine 26, an extrusion forming process (a preparation process), which extrusion-molds a window molding intermediate body 27 for forming the window molding 15, is carried out.

Figure 4:
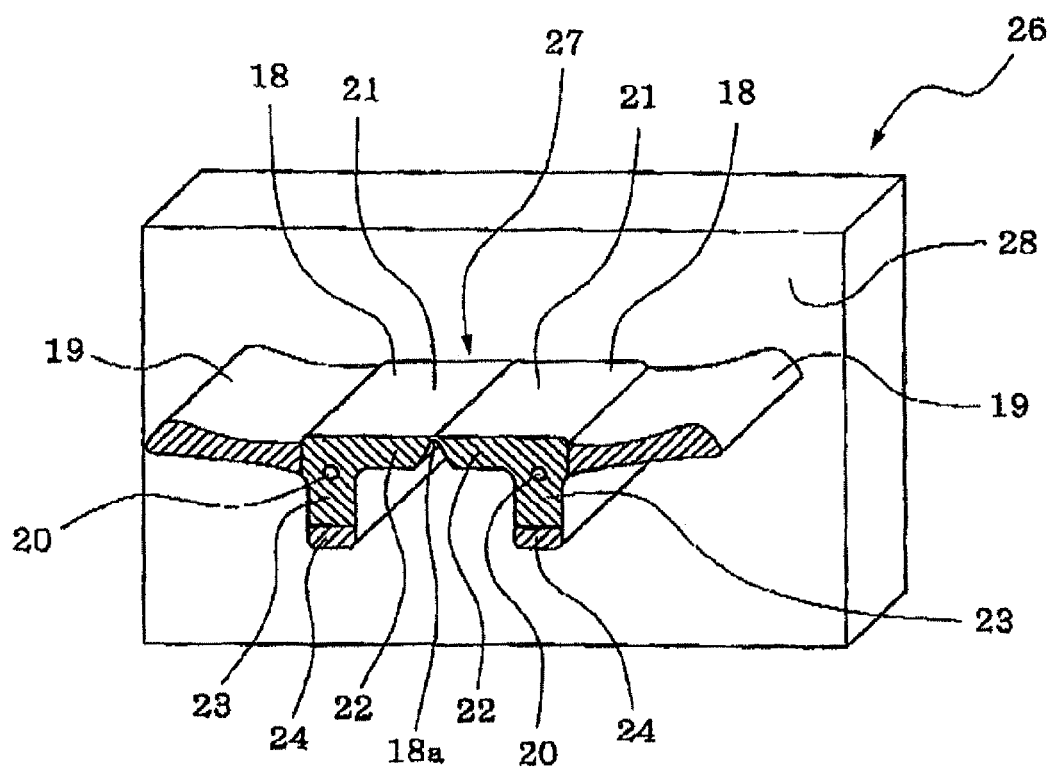
FIG. 4 is a diagram that shows an extrusion machine from a downstream side.

As shown in FIG. 4, the window molding intermediate body 27 includes a pair of window molding main bodies 18 and lip portions 19, and the end portions of the opposite side of the lip portion 19 of the pair of window molding main bodies 18 are formed in the shape of being joined by a joint portion 18a. The edges 21a of the tape attaching surfaces 21 of the pair of window molding main bodies 18 are joined to each other. Further, the window molding intermediate body 27 may have a shape in which the end portions of the opposite side of the lip portion 19 of the head portions 22 of the pair of window molding main bodies 18 are joined to each other.

In the exemplary embodiment, the window molding intermediate body 27 is formed in a shape in which the respective tape attaching surfaces 21 of the pair of window molding main bodies 18 are joined so as to become a continuous plane surface. In the extrusion machine 26, an extrusion die 28 performing the extrusion molding of the window molding intermediate body 27 is provided, and the extrusion die 28 is consecutively supplied with the elastic polymer material for molding the window molding in the extrusion die 28 while consecutively supplying the extrusion die 28 with a contraction preventing wire 20, thereby performing the extrusion molding of the window molding intermediate body 27.

Then, in a case where the polymer material forming the window molding intermediate body 27 (the window molding main body 18 and the lip portion 19) is a thermoplastic resin (for example, TPO), as shown in FIG. 3, a treatment process is carried out. In the treatment process, the window molding intermediate body 27 is solidified by cooling the window molding intermediate body 27 of a non-solidified state extruded from the extrusion machine 26 by a cooling machine 29 such as a water cooling bath.

In addition, in a case where the polymer material forming the window molding intermediate body 27 (the window molding main body 18 and the lip portion 19) is a lubber (for example, EPDM), the window molding intermediate body 27 of the non-vulcanization state extruded from the extrusion machine 26 is supplied to a hardening treatment device (not shown). The hardening treatment device carries out a treatment process of vulcanizing and hardening the window molding intermediate body 27 by heating the window molding intermediate body 27 by a heater (for example, a high frequency heater and a hot air heater). After vulcanizing and hardening the window molding intermediate body 27, the window molding intermediate body 27 is cooled by a cooler 29 such as a cooling water bath as necessary.

Thereafter, the window molding intermediate body 27 is supplied to a primer applicator 30, and a primer application process is carried out, in which primer is applied to the tape attaching surface 21 of the window molding intermediate body 27 by the primer applicator 30. In the primer applicator 30, an application tool 31 (for example, a brush, a felt, or the like) having approximately the same as the width (twice the width of the tape attaching surface 21 of one window molding main body 18) of the tape attaching surface 21 of the window molding intermediate body 27 or shorter than that, and a support 32 which supports the window molding intermediate body 27 are provided. The application tool 31 applies the primer to the respective tape attaching surfaces 21 of the pair of window molding main bodies 18 of the window molding intermediate body 27. As a result, it is possible to enhance the adhesion between the tape attaching surface 21 and the double-sided tape 16.

Thereafter, the window molding intermediate body 27 is supplied to a tape attaching machine 34, and a tape attaching process is carried out, in which a piece of double-sided tape 16 is attached to the tape attaching surface 21 of the window molding intermediate body 27 by the tape attaching machine 34. In the tape attaching machine 34, a tape supply roller 35 around which the double-sided tape 16 is wound, a tape guide roller 36 (a tape guide tool) which restricts the positions of the double-sided tape 16, a crimp roller 37 which compresses the double-sided tape 16, and a support 38 which supports the window molding intermediate body 27, are provided.

Figure 5:
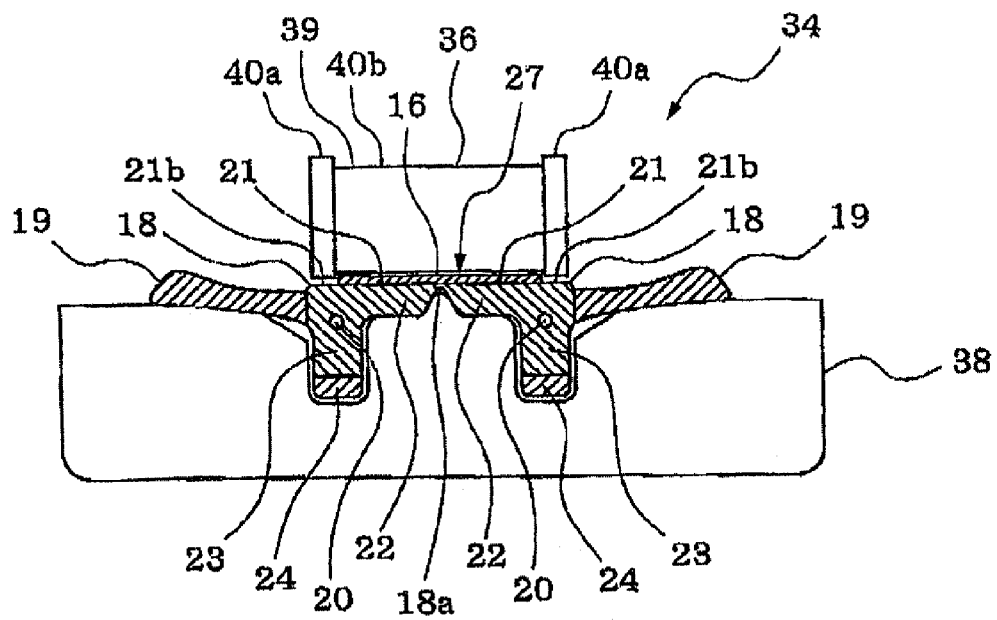
FIG. 5 is a diagram that shows a tape guide roller of a tape attaching machine and a periphery portion thereof from a downstream side.

As shown in FIG. 5, the tape guide roller 36 is formed in approximately the same width (twice the width of the tape attaching surface 21 of one window molding main body 18) as the width of the tape attaching surface 21 of the window molding intermediate body 27. On the outer periphery portion of the tape guide roller 36, a guide portion 39 is formed. Convex portions 40a are provided on both ends of the guide portion 39, respectively. The convex portions 40a are provided adjacent to the guide margin 21b and the double-sided tape 16 is situated in the concave portion 40b formed between the two convex portions 40a, thereby restricting the positions of the double-sided tape 16. In this case, the widths (for example, about 1 mm) of the respective convex portions 40a of the tape guide roller 36 become the widths of the guide margin 21b of the double-sided tape 16. The double-sided tape 16 is attached to the tape attaching surface 21 of the window molding intermediate body 27 leaving both ends as the guide margin 21b of the double-sided tape 16, respectively. For this reason, the width of the tape attaching surface 21 of the window molding intermediate body 27 (twice the width of the tape attaching surface 21 of one window molding main body 18) becomes larger than the width of the double-sided tape 16 by the width of the guide margin 21b (for example, about 2 mm) at both ends. Further, the support 38 is formed in a shape corresponding to a lower portion of the window molding intermediate body 27 so as to support the window molding intermediate body 27 from a lower part.

In the tape attaching process, a piece of double-sided tape 16 is attached over the respective tape attaching surfaces 21 of the pair of window molding main bodies 18 of the window molding intermediate body 27, while guiding the piece of double-sided tape 16 to be supplied from the tape supply roller 35 to a predetermined position of the tape attaching surface 21 of the window molding intermediate body 27 (a position where the guide margins 21b of the piece of double-sided tape 16 remain in both ends of the tape attaching surface 21) by the tape guide roller 36, and the double-sided tape 16 on the tape attaching surface 21 is compressed by the crimp roller 37.

Figure 6:
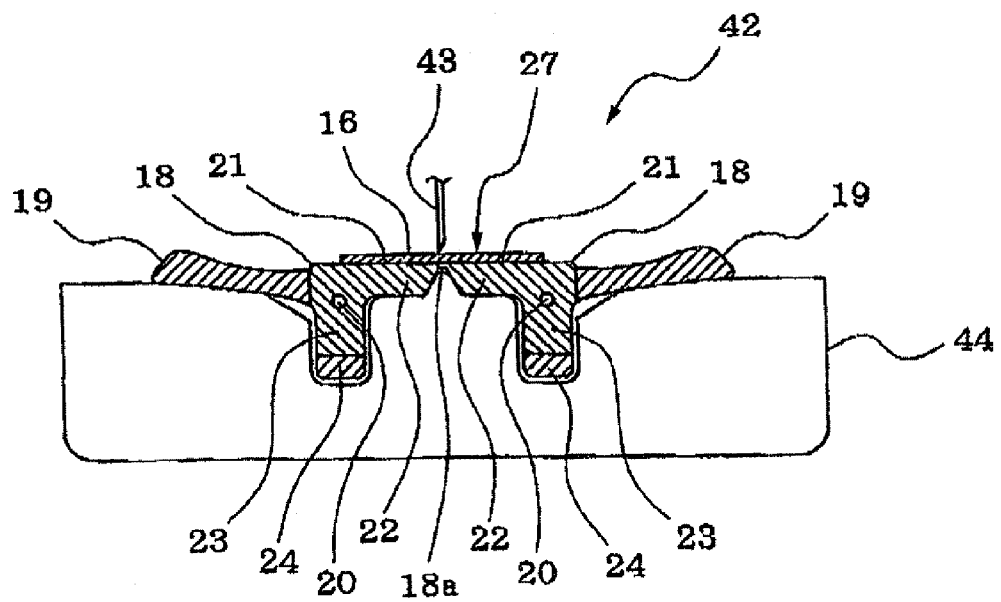
FIG. 6 is a diagram that shows a dividing machine from a downstream side.

Thereafter, as shown in FIG. 3, the window molding intermediate body 27 to which the piece of double-sided tape 16 is attached is supplied to the dividing machine 42 while being hauled by a hauling roller 41, and a dividing process is carried out, in which the window molding intermediate body 27 to which the piece of double-sided tape 16 is attached is divided by the dividing machine 42. As shown in FIG. 6, a dividing blade 43 which cuts the window molding intermediate body 27 and the double-sided tape 16 and a support 44 which supports the window molding intermediate body 27 are provided in the dividing machine 42. The dividing blade 43 is disposed so as to descend from the upper part of a middle portion (the joint portion 18a of the pair of window molding main body 18) of the window molding intermediate body 27 to a position exceeding the joint portion 18a of the window molding intermediate body 27 to cut the window molding intermediate body 27 and the double-sided tape 16 in a longitudinal direction. Further, the support 44 is formed in a shape corresponding to a lower portion of the window molding intermediate body 27 so as to support the window molding intermediate body 27 from the lower part.

In the dividing process, the window molding intermediate body 27 and the double-sided tape 16 are cut by the dividing blade 43 along the joint portion 18a of the pair of window molding main bodies 18 of the window molding intermediate body 27 and are divided into two window moldings 15. As a result, the two window moldings 15 are in a state in which a position of the side edge of the double-sided tape 16 and the position of the edge 21a of the tape attaching surface 21 at the opposite side of the end portion of the window molding main body from which the lip portion 19 protrudes approximately coincide with each other (a state in which the double-sided tape 16 is attached up to the edge 21a of the tape attaching surface 21 at the opposite side of the lip portion 19).

Thereafter, as shown in FIG. 3, the window molding 15 is supplied to the cutting machine 45, and the window molding 15 is cut with the cutting blade 46 of the cutting machine 45 whenever the front end portion of the window molding 15 is detected by a position sensor 47 (for example, a light sensor including a luminous element 47a and a photo receptor 47b) disposed so as to be separated from the cutting blade 46 of the cutting machine by a predetermined gap to the downstream side, thereby cutting the window molding 15 by a predetermined length. As a result, the manufacturing of the window molding 15 (that is, the window molding in which the position of the side edge of the double-sided tape 16 and the position of the edge 21a of the tape attaching surface 21 at the opposite side of the lip portion 19 approximately coincide with each other) is completed.

In the above-described present exemplary embodiment, in regard to the window molding 15, since the position of the side edge of the double-sided tape 16 and the position of the edge 21a of the tape attaching surface 21 at the opposite side of the end portion of the window molding main body from which the lip portion 19 protrudes approximately coincide with each other (that is, the double-sided tape 16 is attached up to the edge 21a of the tape attaching surface 21 at the opposite side of the lip portion 19), as compared to a window molding in which there is a space between the position of the side edge of the double-sided tape and the position of the edge of the tape attaching surface (a window molding in which the double-sided tape is attached to the tape attaching surface leaving both ends as the guide margin 21b of the double-sided tape), the width of the tape attaching surface 21 can be reduced, which can reduce the width of the window molding 15. As a result, the cross-sectional area of the window molding 15 can be reduced, which can reduce the weight of the window molding 15.

Figure 7:
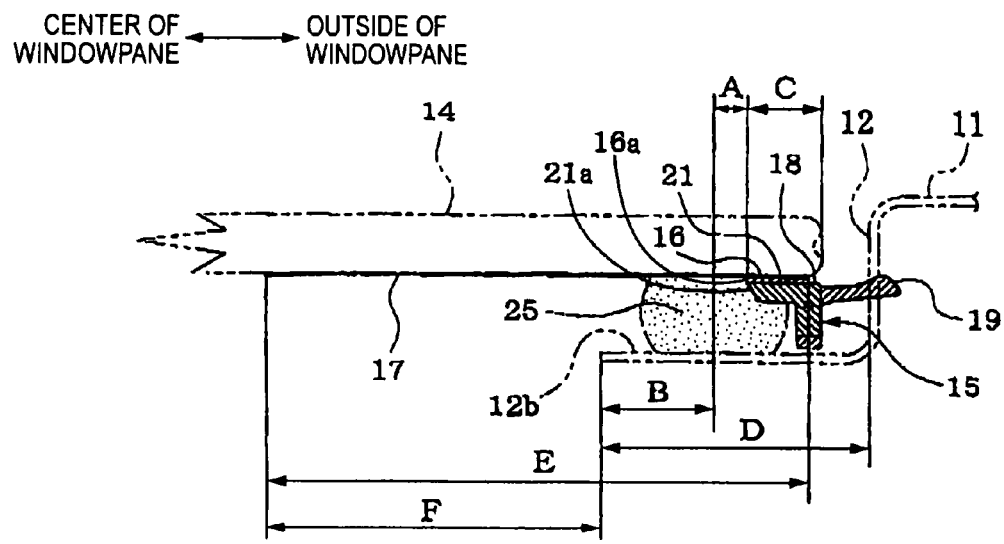
FIG. 7 is a cross-sectional diagram that shows a state in which the window molding of the exemplary embodiment is attached to a car body.
Figure 8:
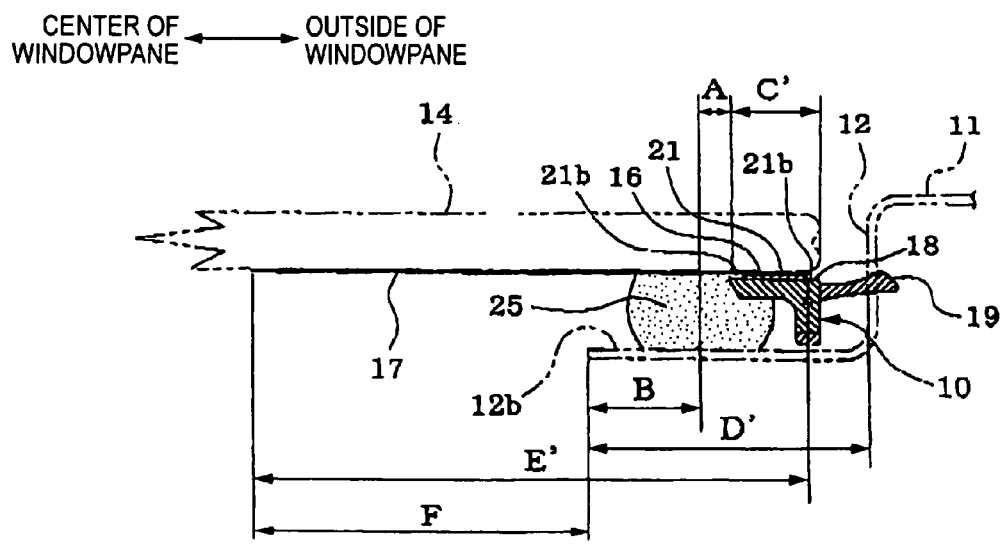
FIG. 8 is a cross-sectional diagram that shows a state in which a window molding of the related art is attached to a car body.

FIG. 7 is a cross-sectional view that shows a state in which the window molding 15 of the exemplary embodiment (the window molding in which the position of the side edge of the double-sided tape 16 and the position of the edge 21a of the tape attaching surface 21 coincide with each other) is attached to a body of a motor vehicle. FIG. 8 is a cross-sectional view that shows a state in which the window molding 10 of the related-art (the window molding in which the double-sided tape is attached to the tape attaching surface 21 leaving both ends as the guide margin 21b of the double-sided tape 16) is attached to the body of the motor vehicle. Further, in FIG. 8, the components other than the window molding 10 are denoted by the same reference numerals as in FIG. 7 for the convenience of the description.

As shown in FIGS. 7 and 8, in the case of deciding the position where the (urethane) sealant 25 or the opaque coloring layer 17 is provided based on the edge of the tape attaching surface 21, a distance A between the edge of the tape attaching surface 21 and the center of the width direction of the (urethane) sealant 25 becomes constant, the distance B between the center of the width direction of the (urethane) sealant 25 and the edge of the bottom wall portion 12b of the window frame 12 becomes constant, and the distance F between the edge of the bottom wall portion 12b of the window frame 12 and the edge of the opaque coloring layer 17 becomes constant.

In this ease, since the width of the tape attaching surface 21 of the window molding 15 of the exemplary embodiment can be reduced compared to that of the window molding 10 of the related art, it is possible to set the position of the edge 21a of the tape attaching surface 21 to the outer periphery side of the windowpane 14 (C<C') (that is, the distance C from the outer periphery side of the windowpane to the edge 21a of the tape attaching surface can be reduced). As a result, since the window molding 15 of the exemplary embodiment can make the center of the (urethane) sealant 25 in the width direction closer to the outer periphery side, compared to the window molding 10 of the related art, it is possible to reduce the width D of the bottom wall portion 12b of the window frame 12 to be bonded with the windowpane 14 via the (urethane) sealant 25 (D<D'). As a result, since the window molding 15 of the invention can make the interior material or the like of the car body placed near the inner periphery edge of the bottom wall portion 12b of the window frame 12 closer to the outer periphery side of the windowpane 14, as compared to the window molding 10 of the related-art, the opaque coloring layer 17 that conceals the interior material or the like can be placed closer to the outer periphery side of the windowpane 14. As a result, it is possible to narrow a formation range E of the opaque coloring layer 17 blocking a view of an outside of the vehicle, when viewed from an inside of the vehicle via the windowpane 14 (E<E'). The view of the outside of the vehicle, when viewed from the inside of the vehicle via the windowpane 14, can thereby be expanded. In addition, since the width D of the bottom wall portion 12b of the window frame 12 can be reduced, there is an advantage in that the car body can become lighter in weight.

Further, in the exemplary embodiment, in the tape attaching process, since the piece of double-sided tape 16 is attached while guiding the double-sided tape 16 to a predetermined position of the tape attaching surface 21 of the window molding intermediate body 27 by a tape guide roller 36, it is possible to accurately attach the double-sided tape 16 to a predetermined position of the tape attaching surface 21.

In addition, in the exemplary embodiment, since the window molding intermediate body 27 is formed in the shape in which two window molding main bodies are joined so that the respective tape attaching surfaces 21 of the pair of the window molding main bodies 18 become a continuous plane surface, in the tape attaching process, upon attaching the piece of double-sided tape 16 over the respective tape attaching surfaces 21 of the pair of window molding main bodies 18, the double-sided tape 16 can be easily attached.

Moreover, in the exemplary embodiment, in the dividing process, since the window molding intermediate body 27 and the double-sided tape 16 are cut and divided with the dividing blade 43, it is possible to easily cut and divide the window molding intermediate body 27 and the double-sided tape 16 with the dividing blade 43.

Further, in the exemplary embodiment, in the case of manufacturing the window molding 15, since the extrusion process (the preparation process) of extruding the window molding intermediate body 27 by the extrusion machine 26 is carried out, it is possible to manufacture the window molding 15 while extruding the window molding intermediate body 27 in a manufacturing line of the window molding 15.

However, the invention is not limited to the method of extruding the window molding intermediate body 27 in the manufacturing line of the window molding 15. The window molding intermediate body 27 may be obtained from external.

Figure 9:
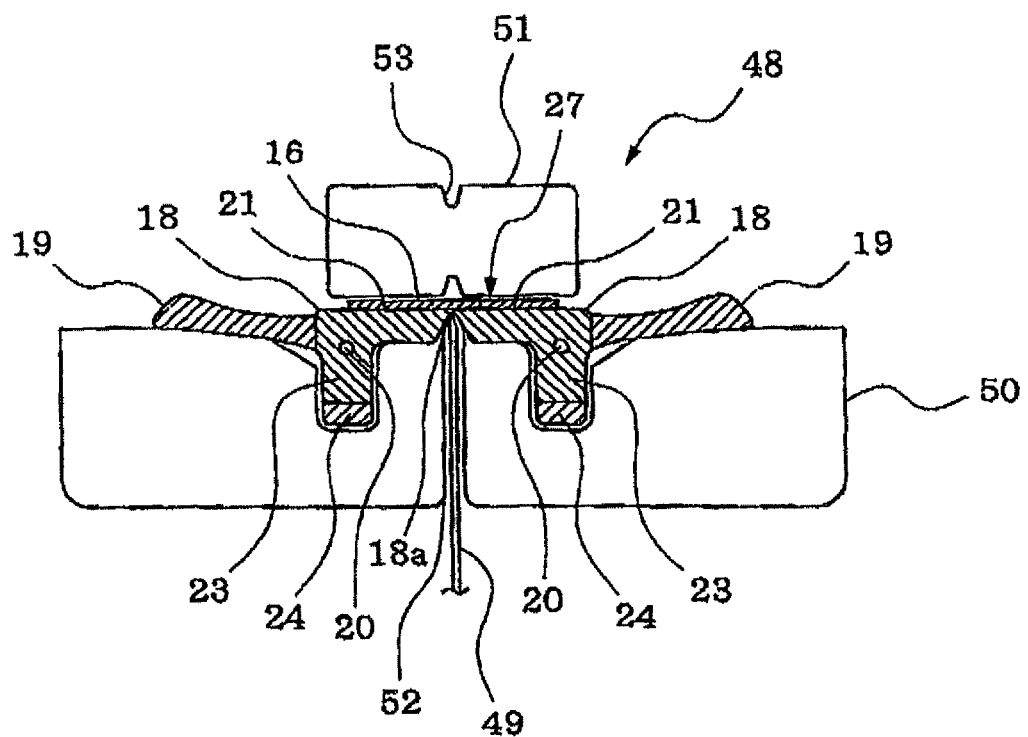
FIG. 9 is a diagram that shows a dividing machine of another exemplary embodiment of the invention from a downstream side.

Further, in the above-described exemplary embodiment, the dividing machine 42 used in the dividing process had a configuration in which the dividing blade 43 descends from the upper part of the window molding intermediate body 27, but the invention is not limited thereto. For example, as shown in FIG. 9, the dividing machine 48 may have a configuration in which the dividing blade 49 rises from the lower part of the window molding intermediate body 27. Specifically, in the dividing machine 48, there is a dividing blade 49 which cuts the window molding intermediate body 27 and the double-sided tape 16, a support 50 which supports the window molding intermediate body 27, and a weight roller 51 which presses the window molding intermediate body 27 from the upper part so that the window molding intermediate body 27 does not float to the upper part. The dividing blade 49 is disposed so as to rise from the lower part of the center portion (the joint portion 18a of the pair of window molding main bodies 18) of the window molding intermediate body 27 up to a position exceeding the joint portion 18a of the window molding intermediate body 27 and the double-sided tape 16 and to cut the window molding intermediate body 27 and the double-sided tape 16 in a longitudinal direction. Further, the support 50 is formed in a shape corresponding to the lower portion of the window molding intermediate body 27 so as to support the window molding intermediate body 27 from the lower part, and a path 52, through which the dividing blade 49 is moved, is formed in the center portion thereof. Further, the weight roller 51 is formed approximately in the same width as the width of the tape attaching surfaces 21 of the window molding intermediate body 27, and a concave groove 53 for preventing contact with the dividing blade 49 is formed in the center portion of the weight roller.

Further, the dividing blade is not limited to being moved in a vertical direction of the window molding intermediate body, but, for example, may be formed in a circular shape (a disk shape) and may rotate along the joint portion of the window molding main body when the window molding intermediate body and the double-sided tape are divided.

Further, in the above-described exemplary embodiment, the invention was applied to the window molding for the front window of the auto vehicle, but the invention may be applied to window molding for other windows (for example, rear windows, side windows, quarter windows or the like) without being limited thereto.

In addition, the invention may be realized by suitably modifying the shape or a material of the window molding (the window molding main body, the lip portion and the like) and the device for manufacturing the window molding (a tape attaching machine or a dividing machine).

While the present invention has been showed and described with reference to the exemplary embodiment thereof, it will be understood by those skilled in the art that various changes in form and details may be made therein without departing from the spirit and scope of the invention.

The present invention provides illustrative, non-limiting aspects as follows:

(1) According to a first aspect, there is provided a long vehicle window molding, which is disposed along an outer periphery edge of a rear surface of a windowpane attached to a window frame of a car body and is fixed to the rear surface of the windowpane by a double-sided tape, the vehicle window molding comprising: a window molding main body that is disposed along the outer periphery edge of the rear surface of the windowpane; a lip portion that protrudes from an end portion of the window molding main body toward a circumference wall portion of the window frame which faces an outer periphery end surface of the windowpane; and the double-sided tape, wherein the double-sided tape is attached to a tape attaching surface of the window molding main body, which faces the rear surface of the windowpane, and wherein a position of a side edge of the double-sided tape and a position of an edge of the tape attaching surface at an opposite side of the end portion of the window molding main body from which the lip portion protrudes coincide with each other along a longitudinal direction of the window molding main body.

According to this configuration, since the position of the side edge of the double-sided tape and the position of the edge of the tape attaching surface at the opposite side of the end portion of the window molding main body from which the lip portion protrudes coincides with each other (that is, the double-sided tape is attached up to the edge of the tape attaching surface at the opposite side of the lip portion), as compared to a window molding in which there is a space between the side edge of the double-sided tape and the edge of the tape attaching surface, the width of the tape attaching surface can be reduced, and the width of the window molding can be reduced. As a result, the cross-sectional area of the window molding can be reduced, which makes it possible to reduce the weight of the window molding and narrow the formation range of an opaque coloring layer blocking a view from an inside of the windowpane, whereby the visibility via the windowpane can be expanded.

(2) According to a second aspect, there is provided the long vehicle window molding according to the first aspect, wherein the window molding main body includes a head portion formed with the tape attaching surface and a leg portion which protrudes from the head portion toward a bottom wall portion of the window frame that faces the rear surface of the windowpane, and wherein the head portion and the leg portion are formed integrally.

(3) According to a third aspect, there is provided the long vehicle window molding according to the first aspect or the second aspect, wherein the window molding main body is formed of a thermoplastic elastomer, and wherein the lip portion is formed of another thermoplastic elastomer which is softer than the thermoplastic elastomer forming the window molding main body. According to this configuration, it is possible to make the window molding main body and the lip portion have suitable elasticity, respectively.

(4) According to a fourth aspect, there is provided the long vehicle window molding according to the first aspect or the second aspect, wherein the window molding main body and the lip portion are formed of ethylene propylene diene rubber. According to this configuration, it is possible to make the window molding main body and the lip portion have suitable elasticity, respectively.

(5) According to a fifth aspect, there is provided the long vehicle window molding according to any one of the first to fourth aspects, wherein a window molding intermediate body for forming the vehicle window molding includes a pair of window molding main bodies and a pair of lip portions, wherein the window molding intermediate body is formed in a shape in which end portions of the window molding main bodies, which are opposite to the end portions from which the lip portions protrude, are joined together, such that at least the edges of the tape attaching surfaces which face the rear surface of the windowpane are joined to each other at a joint portion, and wherein the vehicle window molding is formed by, attaching a piece of double-sided tape over the tape attaching surfaces of both of the window molding main bodies of the window molding intermediate body, and dividing the window molding intermediate body and the piece of double-sided tape along the joint portion of the window molding main bodies after attaching the piece of double-sided tape thereto. According to this configuration, it is possible to easily realize the window molding (the window molding in which the position of the side edge of the double-sided tape and the position of the edge of the tape attaching surface at the opposite side of the end portion of the window molding main body from which the lip portion protrudes coincides with each other) of the invention.

(6) According to a sixth aspect, there is provided a method for manufacturing a long vehicle window molding which is disposed along an outer periphery edge of a rear surface of a windowpane attached to a window frame of a car body and is fixed to the rear surface of the windowpane by a double-sided tape, the vehicle window molding including, a window molding main body that is disposed along the outer periphery edge of the rear surface of the windowpane, a lip portion that protrudes from an end portion of the window molding main body toward a circumference wall portion of the window frame which faces an outer periphery end surface of the windowpane, and the double-sided tape, and a window molding intermediate body is used for forming the vehicle window molding, the window molding intermediate body including a pair of window molding main bodies and a pair of lip portions, and the window molding intermediate body being formed in a shape in which end portions of the window molding main bodies, which are opposite to the end portions from which the lip portions protrude, are joined together, such that at least the edges of the tape attaching surfaces which faces the rear surface of the windowpane are joined to each other at a joint portion, the method of manufacturing the vehicle window molding comprising: preparing the window molding intermediate body; attaching a piece of double-sided tape over the respective tape attaching surfaces of the window molding main bodies of the window molding intermediate body; and dividing the window molding intermediate body and the piece of double-sided tape along the joint portion of the window molding main bodies. According to this configuration, it is possible to effectively manufacture the window molding of the present invention (the window molding in which the position of the side edge of the double-sided tape and the position of the edge of the tape attaching surface at the opposite side of the end portion of the window molding main body from which the lip portion protrudes coincides with each other).

(7) According to a seventh aspect, there is provided the method for manufacturing a long vehicle window molding according to the sixth aspect, wherein the window molding intermediate body is prepared by extrusion molding. According to this configuration, it is possible to manufacture window moldings while performing the extrusion-molding of the window molding intermediate body in a manufacturing line of the window molding.

(8) According to an eighth aspect, there is provided the method for manufacturing a long vehicle window molding according to the sixth aspect or the seventh aspect, wherein a tape guide tool having a guide portion that restricts the position of the double-sided tape is used for attaching the piece of double-sided tape, wherein two convex portions and one concave portion are formed in the guide portion, and wherein the double-sided tape is attached while guiding the double-sided tape to a predetermined position of the tape attaching surface, by placing the double-sided tape in the concave portion between the two convex portions. According to this configuration, it is possible to accurately attach the double-sided tape to a predetermined position of the tape attaching surface of the window molding main bodies.

(9) According to a ninth aspect, there is provided the method for manufacturing a long vehicle window molding according to any one the sixth to eighth aspect, wherein the window molding intermediate body and the piece of double-sided tape are divided by a cutting with a dividing blade. Here, the dividing blade may be moved in an up and down direction of the window molding intermediate body at the time of dividing the window molding intermediate body and the piece of double-sided tape, or may be rotated along the joint portion of the window molding main body. According to this configuration, it is possible to easily cut and divide the window molding intermediate body and the piece of double-sided tape with the dividing blade.

(10) According to a tenth aspect, there is provided the method for manufacturing a long vehicle window molding according to any one of the sixth to ninth aspect, wherein the window molding intermediate body is formed in a shape in which the pair of vehicle window moldings is joined so that the tape attaching surfaces of the window molding main bodies become a continuous plane surface. According to this configuration, when attaching the piece of double-sided tape over the respective tape attaching surfaces of the pair of window molding main bodies, the piece of double-sided tape can be easily attached.

(11) According to an eleventh aspect, there is provided the method for manufacturing a long vehicle window molding according to any one of the sixth to the tenth aspect, wherein a primer is applied to the tape attaching surfaces of the window molding main bodies of the window molding intermediate body before attaching the piece of double-sided tape. According to this configuration, it is possible to enhance the adhesion between the tape attaching surface and the double-sided tape.

(12) According to a twelfth aspect, there is provided a long vehicle window molding, which is disposed along an outer periphery edge of a rear surface of a windowpane attached to a window frame of a car body and is fixed to the rear surface of the windowpane by a double-sided tape, the vehicle window molding comprising: a window molding main body that is disposed along the outer periphery edge of the rear surface of the windowpane; a lip portion that protrudes from an end portion of the window molding main body toward a circumference wall portion of the window frame which faces an outer periphery end surface of the windowpane; and the double-sided tape, wherein the double-sided tape is attached to a tape attaching surface of the window molding main body, which faces the rear surface of the windowpane, and wherein in forming a side edge of the double-sided tape and an edge of the tape attaching surface that is at an opposite side of the end portion of the window molding main body from which the lip portion protrudes, a window molding intermediate body and a piece of double-sided tape for forming the vehicle window molding are cut at a position where the window molding intermediate body and the piece of double-sided tape overlap each other.

What is claimed is:

1. A long vehicle window molding, which is disposed along an outer periphery edge of a rear surface of a windowpane attached to a window frame of a car body and is fixed to the rear surface of the windowpane by a double-sided tape, the vehicle window molding comprising:
   a window molding main body that is disposed along the outer periphery edge of the rear surface of the windowpane;
   a lip portion that protrudes from an end portion of the window molding main body toward a circumference wall portion of the window frame which faces an outer periphery end surface of the windowpane; and
   the double-sided tape,
   wherein the double-sided tape is attached to a tape attaching surface of the window molding main body, which faces the rear surface of the windowpane,
   wherein an inner edge of the double-sided tape and an inner edge of the tape attaching surface coincide with each other along a longitudinal direction of the window molding main body, and
   wherein the inner edge of the tape attaching surface is located at an opposite side of the window molding main body from the lip portion.

2. The long vehicle window molding according to claim 1,
   wherein the window molding main body includes a head portion formed with the tape attaching surface and a leg portion which protrudes from the head portion toward a bottom wall portion of the window frame that faces the rear surface of the windowpane, and
   wherein the head portion and the leg portion are formed integrally.

3. The long vehicle window molding according to claim 1,
   wherein the window molding main body is formed of a thermoplastic elastomer, and
   wherein the lip portion is formed of another thermoplastic elastomer which is softer than the thermoplastic elastomer forming the window molding main body.

4. The long vehicle window molding according to claim 1,
   wherein the window molding main body and the lip portion are formed of ethylene propylene diene rubber.

5. The long vehicle window molding according to claim 1,
   wherein a window molding intermediate body for forming the vehicle window molding includes a pair of window molding main bodies and a pair of lip portions,
   wherein the window molding intermediate body is formed in a shape in which end portions of the window molding main bodies, which are opposite to the end portions from which the lip portions protrude, are joined together, such that at least the edges of the tape attaching surfaces which face the rear surface of the windowpane are joined to each other at a joint portion, and
   wherein the vehicle window molding is formed by,
   attaching a piece of double-sided tape over the tape attaching surfaces of both of the window molding main bodies of the window molding intermediate body, and
   dividing the window molding intermediate body and the piece of double-sided tape along the joint portion of the window molding main bodies after attaching the piece of double-sided tape thereto.

6. A method for manufacturing a long vehicle window molding which is disposed along an outer periphery edge of a rear surface of a windowpane attached to a window frame of a car body and is fixed to the rear surface of the windowpane by a double-sided tape, the vehicle window molding including a window molding main body that is disposed along the outer periphery edge of the rear surface of the windowpane, a lip portion that protrudes from an end portion of the window molding main body toward a circumference wall portion of the window frame which faces an outer periphery end surface of the windowpane, and the double-sided tape, and a window molding intermediate body is used for forming the vehicle window molding, the window molding intermediate body including a pair of window molding main bodies and a pair of lip portions, and the window molding intermediate body being formed in a shape in which end portions of the window molding main bodies, which are opposite to the end portions from which the lip portions protrude, are joined together, such that at least the edges of the tape attaching surfaces which faces the rear surface of the windowpane are joined to each other at a joint portion,
   the method of manufacturing the vehicle window molding comprising:
   preparing the window molding intermediate body;
   attaching a piece of double-sided tape over the respective tape attaching surfaces of the window molding main bodies of the window molding intermediate body; and
   dividing the window molding intermediate body and the piece of double-sided tape along the joint portion of the window molding main bodies such that a resultant edge of the double-sided tape and a resultant edge of the tape attaching surface coincide with each other along a longitudinal direction of the divided window molding intermediate body.

7. The method for manufacturing a long vehicle window molding according to claim 6, further comprising
   extrusion molding the window molding intermediate body.

8. The method for manufacturing a long vehicle window molding according to claim 6,
   wherein a tape guide tool having a guide portion that restricts the position of the double-sided tape is used for attaching the piece of double-sided tape,
   wherein two convex portions and one concave portion are formed in the guide portion, and
   wherein the double-sided tape is attached while guiding the double-sided tape to a predetermined position of the tape attaching surface, by placing the double-sided tape in the concave portion between the two convex portions.

9. The method for manufacturing a long vehicle window molding according to claim 6, wherein the window molding intermediate body and the piece of double-sided tape are divided by a cutting with a dividing blade.

10. The method for manufacturing a long vehicle window molding according to claim 6,
wherein the window molding intermediate body is formed in a shape in which the pair of vehicle window moldings is joined so that the tape attaching surfaces of the window molding main bodies become a continuous plane surface.

11. The method for manufacturing a long vehicle window molding according to claim 6,
wherein a primer is applied to the tape attaching surfaces of the window molding main bodies of the window molding intermediate body before attaching the piece of double-sided tape.

12. A long vehicle window molding, which is disposed along an outer periphery edge of a rear surface of a windowpane attached to a window frame of a car body and is fixed to the rear surface of the windowpane by a double-sided tape, the vehicle window molding comprising:

a window molding main body that is disposed along the outer periphery edge of the rear surface of the windowpane;
a lip portion that protrudes from an end portion of the window molding main body toward a circumference wall portion of the window frame which faces an outer periphery end surface of the windowpane; and
the double-sided tape,
wherein the double-sided tape is attached to a tape attaching surface of the window molding main body, which faces the rear surface of the windowpane,
wherein in forming an inner edge of the double-sided tape and an inner edge of the tape attaching surface, a window molding intermediate body and a piece of double-sided tape for forming the vehicle window molding are cut at a position where the window molding intermediate body and the piece of double-sided tape overlap each other, and
wherein the inner edge of the tape attaching surface is located at an opposite side of the window molding main body from the lip portion.

* * * * *